United States Patent
Shah et al.

(10) Patent No.: US 9,661,547 B1
(45) Date of Patent: *May 23, 2017

(54) METHOD AND SYSTEM FOR HANDOVER WITH PRE-CONFIGURATION OF TIMING ADVANCE

(71) Applicant: Sprint Spectrum L.P., Overland Park, KS (US)

(72) Inventors: Maulik K. Shah, Austin, TX (US); Siddharth S. Oroskar, Overland Park, KS (US); Nitesh Manchanda, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/992,670

(22) Filed: Jan. 11, 2016

Related U.S. Application Data

(63) Continuation of application No. 14/517,465, filed on Oct. 17, 2014, now Pat. No. 9,264,961.

(51) Int. Cl.
H04W 36/00 (2009.01)
H04W 36/30 (2009.01)

(52) U.S. Cl.
CPC ....... *H04W 36/30* (2013.01); *H04W 36/0055* (2013.01); *H04W 36/0083* (2013.01)

(58) Field of Classification Search
CPC .................................................... H04W 36/30
USPC ....................................................... 455/436
See application file for complete search history.

(56) References Cited

U.S. PATENT DOCUMENTS

| | | | | |
|---|---|---|---|---|
| 8,937,924 | B2* | 1/2015 | Choi | H04W 76/062 370/252 |
| 2008/0268850 | A1* | 10/2008 | Narasimha | H04W 36/0072 455/437 |
| 2009/0028112 | A1* | 1/2009 | Attar | H04W 36/245 370/332 |
| 2010/0210268 | A1* | 8/2010 | Lim | H04W 36/04 455/436 |
| 2012/0076121 | A1* | 3/2012 | Choi | H04W 76/062 370/338 |
| 2012/0122459 | A1* | 5/2012 | Wu | H04W 36/0022 455/437 |
| 2012/0207070 | A1* | 8/2012 | Xu | H04W 48/20 370/311 |

(Continued)

FOREIGN PATENT DOCUMENTS

WO  WO 2013/037842  3/2013

*Primary Examiner* — Santiago Garcia

(57) ABSTRACT

A method and system for pre-configuring a UE with timing advance for use in communication with a handover target. When a UE is being served by a handover source, the handover source transmits to a handover target a measurement request that specifies an uplink reference signal that the UE will provide, and the handover target evaluates that uplink reference signal to determine a timing advance for the UE and reports the timing advance in a response to the handover source. As the handover source then directs the UE to hand over to the handover target, the handover source provides the UE with an indication of the timing advance provided by the handover target. The UE may then transition to be served by the handover target and to make use of the indicated timing advance.

13 Claims, 4 Drawing Sheets

(56) References Cited

U.S. PATENT DOCUMENTS

| | | | |
|---|---|---|---|
| 2013/0035101 A1* | 2/2013 | Wang | H04W 36/08 455/437 |
| 2013/0242919 A1* | 9/2013 | Koo | H04W 72/1215 370/329 |
| 2014/0220982 A1* | 8/2014 | Jung | H04W 8/26 455/437 |
| 2014/0295849 A1* | 10/2014 | Sirotkin | H04L 5/0085 455/437 |
| 2014/0370894 A1* | 12/2014 | Hosdurg | H04W 36/0077 455/436 |
| 2014/0378144 A1* | 12/2014 | Legg | H04W 24/10 455/437 |
| 2014/0378145 A1* | 12/2014 | Legg | H04W 36/0083 455/437 |
| 2015/0031379 A1* | 1/2015 | Zhi | H04W 24/10 455/450 |
| 2015/0230134 A1* | 8/2015 | Chiba | H04W 36/0016 370/331 |
| 2015/0237540 A1* | 8/2015 | Van Lieshout | H04W 36/0055 455/436 |

* cited by examiner

METHOD AND SYSTEM FOR HANDOVER WITH PRE-CONFIGURATION OF TIMING ADVANCE

REFERENCE TO RELATED APPLICATION

This is a continuation of U.S. patent application Ser. No. 14/517,465, filed Oct. 17, 2014, the entirety of which is hereby incorporated by reference.

BACKGROUND

Unless otherwise indicated herein, the description provided in this section is not itself prior art and is not admitted to be prior art by being included in this section.

A typical cellular wireless network includes a number of base stations each radiating to define a respective coverage area in which user equipment devices (UEs) such as cell phones, tablet computers, tracking devices, embedded wireless modules, and other wirelessly equipped communication devices (whether or not operated by a human user), can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol or "radio access technology," with communications from the base stations to mobile terminals defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1×RTT and 1×EV-DO), Wireless Interoperability for Microwave Access (WiMAX), and Global System for Mobile Communications (GSM), among others. Each protocol may define its own procedures for registration of mobile terminals, initiation of communications, handover between coverage areas, and other functions related to air interface communication.

In accordance with the air interface protocol, each coverage area may operate on one or more carrier frequencies or range of carrier frequencies. Further, each coverage area may define a number of channels or specific resources for carrying signals and information between the base station and UEs. For instance, certain resources on the downlink may be reserved to carry a reference signal that UEs may detect as an indication of coverage and may measure to evaluate coverage quality, other resources on the downlink may be reserved to carry other control signaling to UEs, and still other resources on the downlink may be reserved to carry bearer traffic and other such communications to UEs. Likewise, certain resources on the uplink may be reserved to carry various control signaling from UEs to the base station, and other resources on the uplink may be reserved to carry bearer traffic and other such communications from UEs.

When a UE is served by a base station, the UE may regularly monitor the reference signal from that base station and reference signals from other base stations in the vicinity, to help ensure that the UE continues to operate in a most appropriate coverage area. If the UE finds that one or more other base stations provide sufficiently strong coverage, perhaps sufficiently stronger than the UE's currently serving base station, then the UE may initiate handover. For instance, the UE may transmit to its serving base station a measurement report that specifies the one or more detected coverage areas and, for each such coverage area, the detected signal strength. The serving base station (source base station) and/or associated network infrastructure may then decide based on the UE's measurement report to process a handover of the UE to a particular base station (target base station) from which the UE detected sufficiently strong signal strength.

OVERVIEW

In an example handover process, the source base station may direct the UE to transition to be served by the target base station, and the UE may then engage in control channel signaling with the target base station in order to transition from having a radio-link-layer connection with the source base station to having a radio-link-layer connection with the target base station. For instance, in response to a radio-link-layer control message from the source base station, the UE may transmit to the target base station, on a random-access channel, an access request, and the target base station may receive that access request and transmit to the UE an access response. Once the UE receives that access response, the UE may then transmit to the target base station a radio-link-layer control message to complete transition of the UE from having a radio-link-layer connection with the source base station to having a radio-link-layer connection with the target base station.

In certain systems, in order for a base station to properly serve a UE, the UE and base station need to synchronize their air interface communications with each other. This is the case, for instance, in an LTE system and perhaps other systems, where a base station expects certain communications from a UE to arrive in particular timeslots or otherwise at particular times, such as where the base station schedules uplink communications from various UEs to occur at respective times and expects those communications to arrive when scheduled. Because it takes time for transmissions from to pass over the air interface from a UE to its serving base station, one way to achieve good synchronization is to measure the UE-to-base-station transmission time and then have the UE start any time-specific communications to start that amount of time earlier than the base station expects them to occur. That way, the base station would receive the communications at or closer to when the base station expects to receive the communications. In LTE and perhaps other systems, that timing offset is known as a "timing advance."

In LTE and perhaps other systems, when a UE engages in handover from one base station to another, the timing advance that the UE will use for its communications to the target base station can be established based on the UE's random-access signaling with the base station. In particular, when the UE sends an access request to the target base station as discussed above, the UE may do so at a predefined point in time such as in a specific sub-frame or time slot designated for use to carry random-access signaling from UEs. The target base station may then be arranged to scan for such an access request arriving within a window of time after the predefined point in time, and upon receiving such a request, to determine as the UE's timing advance a difference between the predefined point in time and the time of receipt of the request. The target base station may then transmit in its access response to the UE an indication of the determined timing advance, as a particular timing-advance value. That way, the UE may then set itself to use the provided timing advance for its subsequent communications to the target base station.

Unfortunately, however, there are downsides to this process. For one, the random-access process itself takes some time and thus contributes to the overall delay in processing a handover from a source base station to a target base station. If that delay is too long, a UE could experience loss of connectivity. Further, random-access channel resources are typically limited, and when many UEs seek to engage in random-access signaling at the same time, there is a chance their access requests could collide or be subject to a contention process in which access requests from one or more of the UEs may fail. Thus, an improved mechanism for establishing a timing advance for communication between a UE and target base station would be desirable.

Disclosed herein is a method and system to help address this issue. In accordance with the disclosure, when a UE is being served by a source base station, the source base station will transmit to a target base station a measurement request that specifies an uplink reference signal that the UE will provide, and the target base station will then evaluate that uplink reference signal to determine a timing advance for the UE and will report that timing advance in a response to the source base station. As the source base station then directs the UE to hand over to the target base station, the source base station may then provide the UE with an indication of the timing advance provided by the target base station. The UE may then transition to be served by the target base station and to make use of the indicated timing advance, without a need to determine the timing advance through random-access signaling in the handover process.

In practice, the measurement request that the source base station sends to the target base station could be a handover request message, which may normally serve the purpose of requesting the target base station to reserve resources to facilitate serving the UE. In particular the source base station may include in its handover request message to the target base station a specification of the UE's uplink reference signal sufficient to allow the target base station to evaluate receipt-time of that signal. And the target base station may then provide in its handover response message to the source base station the determined timing advance for the UE.

Alternatively, the measurement request that the source base station sends to the target base station could be a predecessor to invoking handover and could serve the additional purpose of helping the source base station decide whether to invoke handover of the UE to the target base station. To facilitate this, the target base station may additionally respond to the source base station's measurement request by not only determining and reporting a timing advance for the UE but also determining and reporting receive-strength of the UE's uplink reference signal. Advantageously, the source base station may then determine if the reported uplink signal strength is sufficiently high, and/or perhaps if the timing advance is sufficiently low, as a condition for deciding to invoke handover of the UE to the target base station. Upon deciding to invoke handover of the UE to the target base station, the source base station may then engage in handover signaling with the target base station and may provide the UE with a handover directive that instructs the UE to transition to be served by the target base station and that provides the UE with the timing advance determined by the target base station.

This latter variation can be used additionally to enable the source base station to intelligently select the target base station from among multiple candidate target base stations, such as multiple base stations from which the UE reported receiving sufficiently strong downlink reference signals. In that scenario, the source base station could send a measurement request respectively to each candidate target base station and could receive in response from each candidate target base station not only an indication of determined timing advance for the UE but also an indication of determined uplink signal strength from the UE. And the source base station may then select as the target base station for handover the one that reported the strongest uplink signal strength from the UE and/or the lowest timing advance for the UE. In turn, the source base station may then invoke handover of the UE to the selected target base station.

Accordingly, in one respect, disclosed is a method for configuring a UE with a timing-advance setting for communication between the UE and a handover target (e.g., a base station to which the UE will hand over). In accordance with the disclosure, while the UE is being served by a handover source, (i) the handover source transmits to the handover target a measurement request that specifies an uplink reference signal of the UE, and (ii) the handover source receives from the handover target, in response to the measurement request, a timing-advance value determined by the handover target based on evaluation of the specified uplink reference signal of the UE. The handover source then transmits to the UE a handover directive that directs the UE to hand over from being served by the handover source to being served by the handover target and that provides the UE with the received timing-advance value to be used by the UE as a timing-advance setting for communication between the UE and the handover target.

In another respect, disclosed is a method that similarly involves advance determination and providing of a timing advance for the UE. In accordance with the method, a base station serves a UE via an air interface that extends between the base station and the UE. While serving the UE, he base station then receives from the UE via the air interface a report that the UE has detected signals from a plurality of other base stations. In response to the report, the base station then sends respectively to each other base station a request for the other base station to evaluate uplink signal strength from the UE, and receives respectively from each other base station, in response to the request sent to the other base station, a report indicating (i) uplink signal strength from the UE as determined by the other base station and (ii) timing advance between the UE and the other base station as determined by the other base station. The base station then selects one of the other base stations based at least in part on the selected other base station having, among the plurality of other base stations, a highest indicated uplink signal strength from the UE. And the base station sends via the air interface to the UE (i) a directive for the UE to hand over to the selected other base station and (ii) the timing advance received by the base station from the selected other base station, for use of the timing advance by the UE to facilitate synchronized air interface communication between the UE and the selected other base station.

Further, in another respect, disclosed is a wireless communication system that includes a first base station for providing first cellular coverage in which to serve UEs, and a second base station for providing second cellular coverage in which to serve UEs. In accordance with the disclosure, the first base station includes a first controller configured to (i) transmit to the second base station a measurement request that specifies an uplink reference signal of a UE served by the first base station, (ii) receive from the second base station, in response to the measurement request, a timing-advance value determined by the second base station based on evaluation of the specified uplink reference signal, (iii) transmit to the UE a handover directive directing the UE to hand over from being served by the first base station to being served by the second base station, and (iv) provide the UE with the received timing-advance value to facilitate communication between the UE and the second base station. Further, the second base station includes a second controller configured to (i) receive from the first base station the measurement request, (ii) respond to the measurement request by evaluating the specified uplink reference signal of the UE to determine the timing-advance value and by transmitting the determined timing-advance value to the first base station, and (iii) receive handover of the UE from being served by the first base station to being served by the second base station.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described herein by way of example with respect to an LTE network. It should be understood, however, that principles of the disclosure can apply in connection with other types of networks as well. Further, even in the context of LTE, it should be understood that variations from the disclosed examples are possible. For instance, features can be added, omitted, combined, distributed, repositioned, re-ordered. In addition, it should be understood that features described as being carried out by one or more entities can be implemented by hardware, firmware, and/or software, such as by a computer programmed with program instructions executable to carry out the described features.

Figure 1:
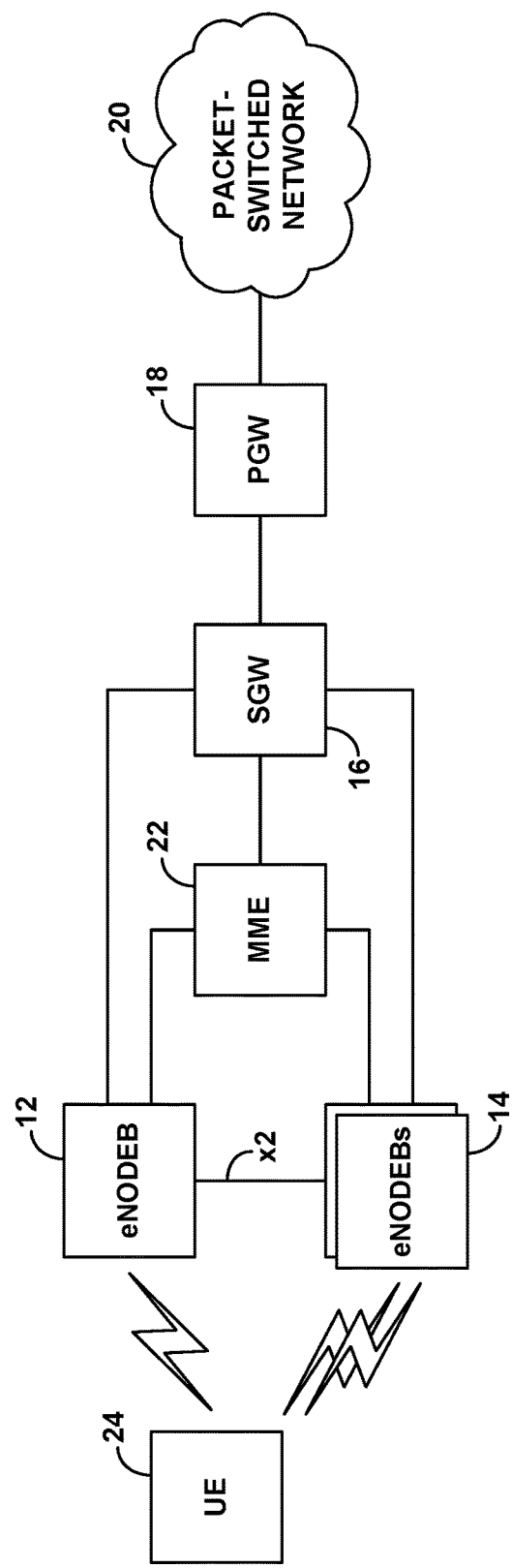
FIG. 1 is a simplified block diagram of an example wireless communication system in which features of the present disclosure can be implemented.

FIG. 1 is a simplified block diagram of an example LTE network in which the disclosed features can be implemented. In the LTE network, each base station is referred to as an evolved Node-B or eNodeB. As shown in FIG. 1, the example network includes a first eNodeB 12 and a plurality of second eNodeBs 14, with each eNodeB radiating to provide a respective coverage area (e.g., LTE cell). The various eNodeBs are then shown by way of example having communication interfaces with a serving gateway (SGW) 16, which in turn has a communication interface with a packet-data network gateway (PGW) 18 that provides connectivity with a packet-switched network 20 such as the Internet. Further, the eNodeBs are also shown having communication interfaces with a mobility management entity (MME) 22, which in turn has a communication interface with the SGW 16. In practice, each of these entities may sit as a node on a packet-switched network operated by a wireless service provider, and thus the illustrated interfaces between the entities may be logical connections across that network.

Shown positioned within coverage of the various eNodeBs is a representative UE 24. With this arrangement, we may assume that UE 24 is attached with eNodeB 12 and is thus being served with wireless communication service by eNodeB 12. As such, we may assume that the UE has worked with eNodeB 12 to establish a Radio Resource Control (RRC) connection defining a radio-link-layer connection between the UE and the eNodeB, and that at least one logical bearer has been established between the UE and the PGW, with the bearer including a radio portion extending between the UE and the eNodeB and an access portion extending between the eNodeB and the PGW via the SGW. Further, we may assume that, as the UE is served by eNodeB 12, the UE regularly monitors a downlink reference signal from eNodeB 12 and from each eNodeB 14 that the UE can detect.

In line with the discussion above, when the UE detects sufficiently strong coverage from one or more eNodeBs 14, such as coverage sufficiently stronger than that of serving eNodeB 12, the UE may transmit a measurement report to eNodeB 12 to trigger possible handover. Under LTE, if the source eNodeB 12 determines that the reported signal strength of a target eNodeB is sufficient, then the source eNodeB may transmit a handover request via an inter-eNodeB "X2" interface to the target eNodeB to prepare the target eNodeB to receive handover of the UE. Upon preparing for handover of the UE, the target eNodeB then transmits to the source eNodeB a handover request acknowledge message that carries information including a C-RNTI identifier for use by the UE to engage in communication with the target eNodeB. The source eNodeB then transmits that information to the UE in an RRC Connection Reconfiguration message that essentially functions as a handover directive to cause the UE to hand over to the target eNodeB.

As further discussed above, the UE may then engage in a random-access process with the target eNodeB followed by further signaling to complete transition of the UE from being connected with the source eNodeB to being connected with the target eNodeB. To facilitate random-access signaling, the uplink air interface to the target eNodeB may have certain random access channel (RACH) instances defined at particular times and frequency segments for carrying random-access request messages from UEs. Each such RACH instance may be a particular sub-frame or timeslot (half sub-frame) in a periodically recurring radio frame, so that the eNodeB knows when the RACH instances occur. When an LTE UE wishes to gain access to communicate with a particular eNodeB, the UE then randomly selects a RACH preamble from a group of defined preambles and transmits the selected preamble in any such RACH instance to the eNodeB. Upon receipt of the preamble, without knowing which UE transmitted it, the eNodeB then determines a timing advance for the UE based on the delay in eNodeB receipt of the UE's preamble compared with when the RACH instance was defined. And the eNodeB then transmits an access response message corresponding with the chosen preamble, specifying in the access response message the determined timing advance.

Upon completion of the random-access process, the UE then transmits to the target eNodeB an RRC Connection Reconfiguration Complete message carrying the provided C-RNTI, and the target eNodeB verifies the C-RNTI, completing the process of transitioning the UE from having a radio-link-layer connection with the source eNodeB to having a radio-link-layer connection with the target eNodeB. Further, the target eNodeB transmits a path-switch request message to the MME to signal a change in cell of the UE, and the MME engages in signaling with the SGW to cause the SGW to switch one or more logical connections for the UE to be with the target eNodeB instead of the source eNodeB. The target eNodeB may then proceed to serve the UE, including scheduling bearer communications to and from the UE, with the UE using its established timing advance to time uplink transmissions to the target eNodeB.

In line with the discussion above, the present disclosure provides a streamlined process for configuring a UE with timing advance for the UE to use in communication with a target eNodeB. In particular, the disclosed process provides that when the UE is still served by the source eNodeB (e.g., before receiving an RRC Connection Reconfiguration message that directs the UE to hand over to the target eNodeB), the target eNodeB will evaluate an uplink reference signal from the UE to determine a timing advance for the UE and will convey the determined timing advance to the source eNodeB so that the source eNodeB can provide the timing advance to the UE when directing the UE to hand over to the target eNodeB. That way, the UE would already have the timing advance for its communication with the target eNodeB and can forgo the random-access process that would otherwise function to establish a timing advance for the UE. Conveniently, the UE can then proceed directly to sending an RRC Connection Reconfiguration Complete message to the target eNodeB, so that the target eNodeB can proceed to serve the UE.

In LTE, the uplink reference signal from the UE is a sounding reference signal (SRS), which the UE transmits periodically on certain defined uplink air interface resources. In one implementation of LTE, UEs transmit their SRSs in the last OFDM symbol (0.67 microsecond segment) of certain periodically recurring subframes, with the SRS spanning 720 kHz (four LTE resource blocks). Each UE's SRS is derived as a cyclic extension of a prime-length Zadoff-Chu sequence and is mapped to every second 15 kHz subcarrier, creating a comb-like spectrum. Further, multiple UEs SRSs may then share the same air interface resources by using different Zadoff-Chu sequences designated by particular "transmission_comb" and "cyclic_shift" attributes.

When a UE connects with an LTE eNodeB, the eNodeB transmits to the UE an RRC control message that provides the UE with an "srs-ConfigIndex" value that defines the periodicity at which the UE should transmit its SRS (e.g., ranging from every 2 subframes to every 32 subframes), and transmission_comb and cyclic_shift attributes that the UE should use for its SRS. The UE then transmits its SRS accordingly with the specified periodicity and attributes, and the eNodeB may evaluate the UE's SRS to monitor uplink signal quality from the UE.

Per the present method, when a UE is being served by source eNodeB 12 and reports having detected coverage of a target eNodeB 14, the source eNodeB may transmit to the target eNodeB a measurement request message that gives the target eNodeB sufficient information to allow the target eNodeB to evaluate the UE's SRS (or the target eNodeB may otherwise have such information). The target eNodeB may then use that information as a basis to evaluate the UE's SRS so as to determine a timing advance that the UE should use when communicating with the target eNodeB. In particular, given the information indicating the recurring time when the UE will be transmitting its particular SRS, the target eNodeB may scan for such an SRS arriving within a window of time after an instance of that time and may determine as a timing advance for the UE the difference between the expected time and the time of receipt of the SRS. The target base station may then transmit a response to the source eNodeB the determined timing advance, and the source eNodeB may provide the timing advance to the UE with a handover directive that directs the UE to transition to be served by the target eNodeB, so that the UE can then forgo engaging in a random-access process with the target eNodeB to determine a timing advance.

In the LTE handover process as discussed above, for instance, the handover request message that the source eNodeB transmits to the target eNodeB over the X2 interface can function as the measurement request in this method. To facilitate this, the source eNodeB may include in the handover request message a specification of the UE's SRS, including the srs-ConfigIndex value designating when the UE is set to transmit its SRS and the transmission_comb and cyclic_shift attributes of the UE's SRS. In turn, after determining a timing advance for the UE, the target eNodeB may then include in its handover request acknowledge message to the source eNodeB the determined timing advance (along with the C-RNTI) for the UE.

Upon receipt of the timing advance from the target eNodeB, the source eNodeB may then transmit the timing advance in its RRC Connection Reconfiguration message to the UE, directing the UE to hand over to the target eNodeB, and thus providing the UE with the timing advance for use by the UE in the UE's communications with the target eNodeB. Advantageously, the UE can thereby proceed directly to sending an RRC Connection Reconfiguration Complete message to the target eNodeB, without the need to engage in random-access signaling with the target eNodeB to facilitate determination of a timing advance as part of the handover process. And once the UE is thus connected with the target eNodeB, the UE may proceed to use the timing advance for its communications with the target eNodeB.

As further noted above, this method can also extend to involve the target eNodeB evaluating the UE's SRS to determine the UE's uplink signal strength (e.g., received signal strength and/or signal to noise ratio) and reporting the determined uplink signal strength to the source eNodeB, and the source eNodeB using that information as a basis to determine that the UE should hand over to the target eNodeB. In particular, this can be usefully done in a scenario where there are multiple candidate target eNodeBs, in which case the source eNodeB may request and receive such uplink signal strength information from each candidate target eNodeB and select one based at least in part on it having the highest reported uplink signal strength from the UE.

In an example of this process, the UE may report to source eNodeB 12 that the UE has detected threshold strong coverage of two or more candidate target eNodeBs 14, informing source eNodeB of the downlink signal strength that the UE detected respectively from each candidate target eNodeB. For each candidate target eNodeB having sufficient reported downlink signal strength, the source eNodeB may then transmit to the target eNodeB a measurement request (e.g., a new message that would precede a possible handover request to the target eNodeB) including a specification of the UE's SRS. Each candidate target eNodeB may then evaluate the UE's SRS to determine both a timing advance for the UE and uplink signal strength from the UE, and each candidate target eNodeB may report that determined information in a response to the source eNodeB.

Based at least in part on the reported uplink signal strengths from the various candidate target eNodeBs, the source eNodeB may then select one of the candidate target eNodeB's to be the handover target for the UE. For instance, the source eNodeB could select the candidate target eNodeB having the highest reported uplink signal strength from the UE and/or otherwise by factoring uplink signal strength in its decision process, possibly along with the reported downlink signal strength per candidate target eNodeB. Further, the source eNodeB could also or alternatively based its selection of target eNodeB on the reported timing advances from the various candidate target eNodeBs. For instance, the source eNodeB could select the candidate target eNodeB having the lowest reported timing advance for the UE on grounds that that may mean the UE is closest to that particular target eNodeB, possibly also considering one or more other factors such as those noted above.

Figure 2:
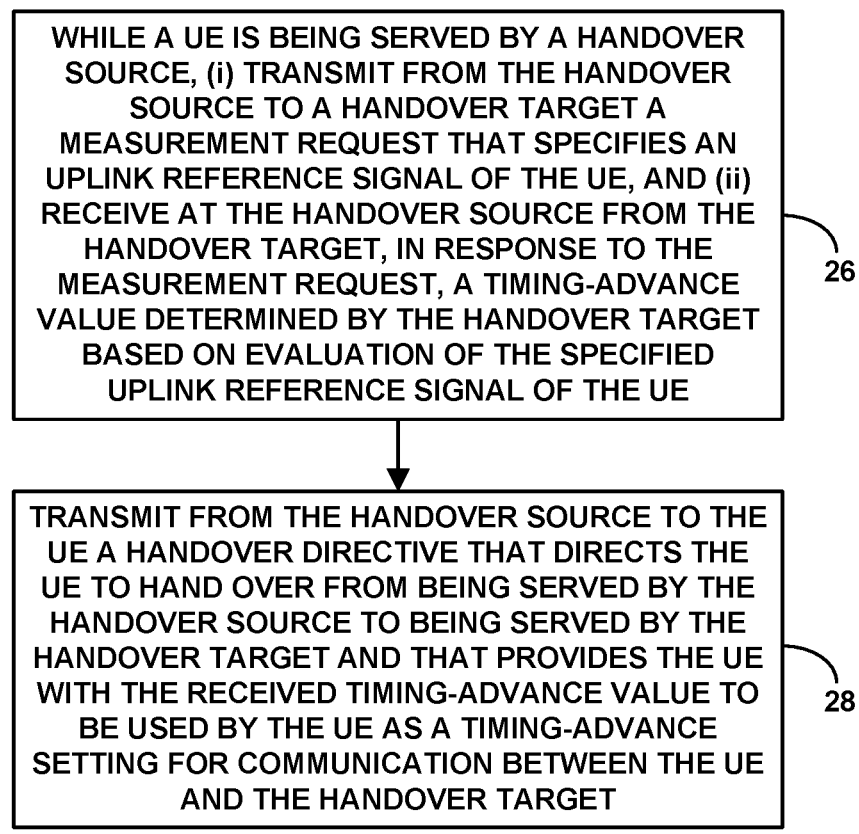
FIG. 2 is a flow chart depicting functions that can be carried out in accordance with the disclosure.

FIG. 2 is next a flow chart depicting aspects of a method to configure a UE with a timing-advance setting for communication between the UE and a handover target. As shown in FIG. 2, at block 26, the method involves, while the UE is being served by a handover source, (i) transmitting from the handover source to the handover target a measurement request that specifies an uplink reference signal of the UE, and (ii) receiving at the handover source from the handover target, in response to the measurement request, a timing-advance value determined by the handover target based on evaluation of the specified uplink reference signal of the UE. Further, at block 28, the method involves transmitting from the handover source to the UE a handover directive that directs the UE to hand over from being served by the handover source to being served by the handover target and that provides the UE with the received timing-advance value to be used by the UE as a timing-advance setting for communication between the UE and the handover target.

In this method, the handover source can be a base station such as eNodeB 12, and the handover target can be a base station such as one of eNodeBs 14. Alternatively, the handover source could be more generally any system (e.g., radio access network and/or one or more components of such a network) that is currently serving the UE, and the handover target can be any system (e.g., another radio access network and/or one or more components of such a network) to which the UE can hand over. As between eNodeBs, as discussed above, communication can occur via an X2 interface or in another manner, such as indirectly via an MME or the like.

Figure 3:
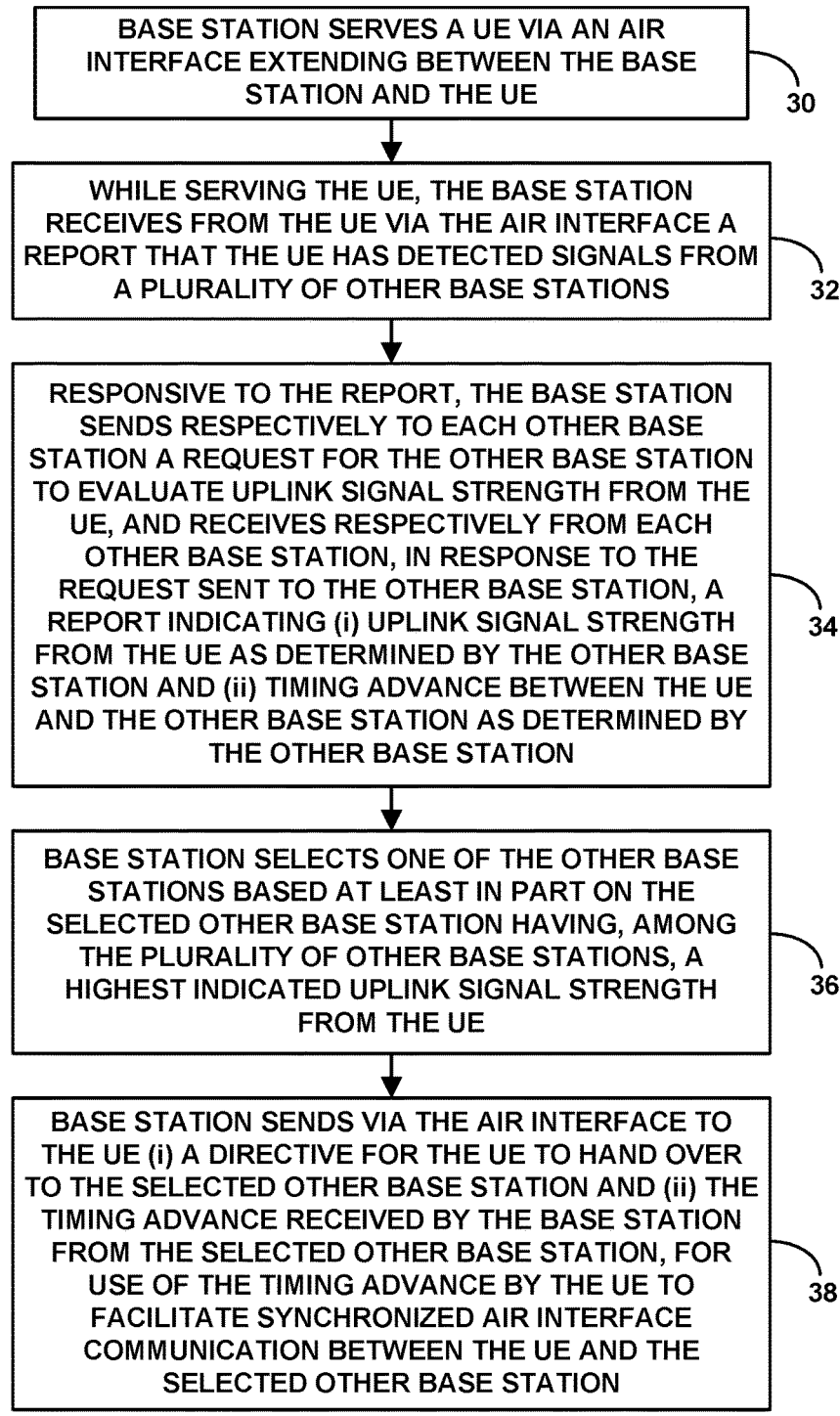
FIG. 3 is another flow chart depicting functions that can be carried out in accordance with the disclosure.

FIG. 3 is next another flow chart depicting certain example aspects of a method per the present disclosure. As shown in FIG. 3, at block 30, a base station serves a UE via an air interface extending between the base station and the UE. At block 32, while thus serving the UE, the base station receives from the UE via the air interface a report that the UE has detected signals from a plurality of other base stations. At block 34, responsive to the report, the base station sends respectively to each other base station a request for the other base station to evaluate uplink signal strength from the UE, and receives respectively from each other base station, in response to the request sent to the other base station, a report indicating (i) uplink signal strength from the UE as determined by the other base station and (ii) timing advance between the UE and the other base station as determined by the other base station.

At block 36, the base station then selects one of the other base stations based at least in part on the selected other base station having, among the plurality of other base stations, a highest indicated uplink signal strength from the UE. And at block 38, the base station sends via the air interface to the UE (i) a directive for the UE to hand over to the selected other base station and (ii) the timing advance received by the base station from the selected other base station, for use of the timing advance by the UE to facilitate synchronized air interface communication between the UE and the selected other base station.

Figure 4:
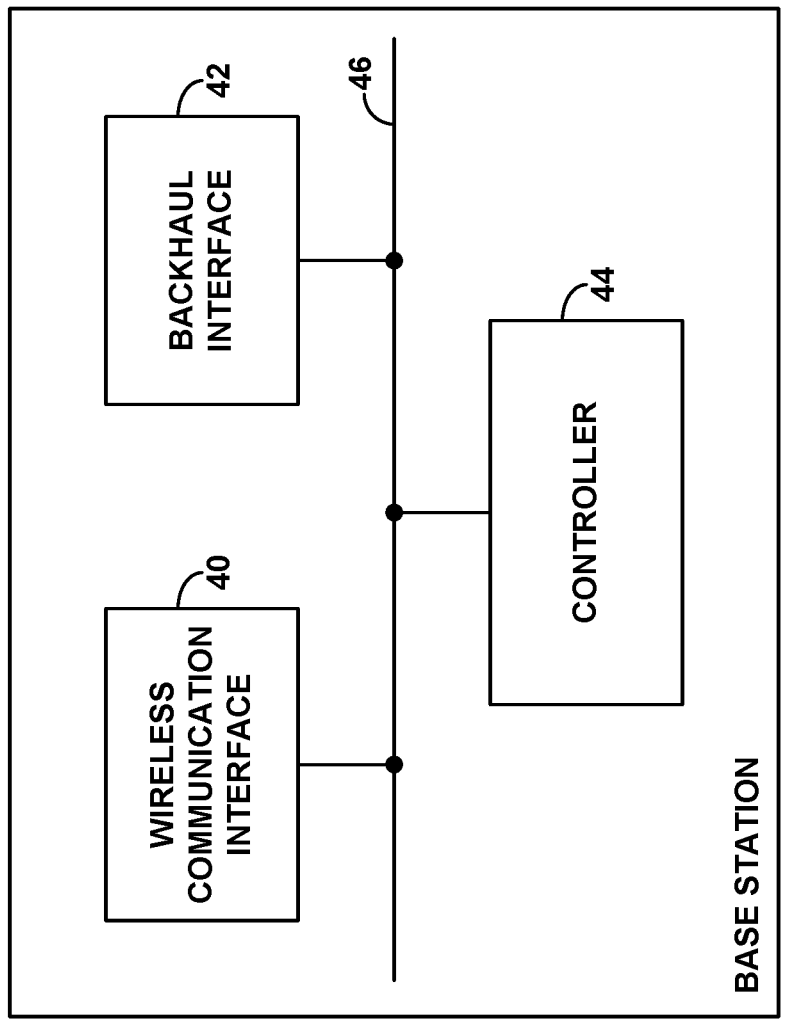
FIG. 4 is a simplified block diagram of an example base station in accordance with the disclosure.

Finally, FIG. 4 is a simplified block diagram of an example base station, which could function as either a source base station or target base station in the arrangement discussed above. As shown in FIG. 4, the example base station includes a wireless communication interface 40, a backhaul interface 42, and a controller 44, all of which may be communicatively linked together by a system bus, network, or other connection mechanism 46.

In this arrangement, the wireless communication interface 40 may be configured to provide cellular coverage and to engage in air interface communication with served UEs. As such, wireless communication interface 40 may comprise an antenna structure (not shown), which may be tower mounted or may take other forms, and associated components such as a power amplifier and a wireless transceiver, so as to facilitate transmission and reception of bearer and control data over the air interface in accordance with an air interface protocol such as LTE or others as noted above. Further, backhaul interface 42 may comprise a wired or wireless interface, such as an Ethernet network communication interface, configured to support communication with other entities, such as X2 communication with other base stations for instance.

Controller 58 may then comprise control logic to cause the base station to carry out particular functions including those discussed above. As such, the controller 58 may take various forms, including but not limited to one or more processors (e.g., general purpose microprocessors and/or dedicated processing units) and data storage holding program instructions executable by the processors(s) to carry out various functions described herein.

As a source base station, these functions may include, among others discussed above, (i) transmitting to a target base station a measurement request that specifies an uplink reference signal of a UE served by the source base station, (ii) receiving from the target base station, in response to the measurement request, a timing-advance value determined by the target base station based on evaluation of the specified uplink reference signal, (iii) transmitting to the UE a handover directive directing the UE to hand over from being served by the source base station to being served by the target base station, and (iv) providing the UE with the received timing-advance value to facilitate communication between the UE and the target base station.

As a target base station, on the other hand, the functions may include, among others discussed above, (i) receiving from the source base station the measurement request, (ii) responding to the measurement request by evaluating the specified uplink reference signal of the UE to determine the timing-advance value and by transmitting the determined timing-advance value to the source base station, and (iii) receiving handover of the UE from being served by the source base station to being served by the target base station, i.e., having the UE hand over to the target base station from being served by the source base station.

Exemplary embodiments have been described above. It should be understood, however, that variations from these embodiments are possible, while remaining within the scope of the invention.

We claim:

1. A method for configuring a user equipment device (UE) with a timing-advance setting for communication between the UE and a handover target, the method comprising:

while the UE is being served by a handover source, (i) transmitting from the handover source to the handover target a measurement request that specifies an uplink reference signal of the UE, and (ii) receiving at the handover source from the handover target, in response to the measurement request, a timing-advance value determined by the handover target based on evaluation of the specified uplink reference signal of the UE; and transmitting from the handover source to the UE a handover directive that directs the UE to hand over from being served by the handover source to being served by the handover target and that provides the UE with the received timing-advance value to be used by the UE as the timing-advance setting for communication between the UE and the handover target.

2. The method of claim 1, wherein the uplink reference signal is a sounding reference signal (SRS), wherein the measurement request specifies the SRS at least in part by designating a time at which the UE is set to transmit the SRS, and wherein the evaluation of the uplink reference signal comprises determining a difference between the designated time at which the UE is set to transmit the SRS and a time at which the handover target receives the SRS.

3. The method of claim 2, wherein the SRS is defined at least in part by transmission_comb and cyclic_shift parameters, and wherein the measurement request specifies the SRS additionally at least in part by designating the transmission_comb and cyclic_shift parameters.

4. The method of claim 1, wherein the handover source is a first Long Term Evolution (LTE) eNodeB, the handover target is a second LTE eNodeB, and communication between the handover source and handover target is via an X2 interface.

5. The method of claim 1, further comprising:

receiving at the handover source from the handover target an identifier useable by the UE to engage communication with the handover target; and transmitting from the handover source to the UE the received identifier.

6. The method of claim 1, further comprising:

receiving at the handover source from the handover target, in response to the measurement request, a report of signal strength of the specified uplink reference signal of the UE; and deciding by the handover source, based at least in part on the received report of signal strength, that the UE should hand over to the handover target.

7. A method for configuring a user equipment device (UE) with a timing-advance setting, the method comprising:

while the UE is being served by a first system and is going to hand over from being served by the first system to being served by a second system, (i) transmitting from the first system to the second system a measurement request that specifies an uplink reference signal of the UE, and (ii) receiving at the first system from the second system, in response to the measurement request, a timing-advance value determined by the second system based on evaluation of the specified uplink reference signal of the UE; and transmitting from the first system to the UE a handover directive that directs the UE to hand over from being served by the first system to being served by the second system and that provides the UE with the received timing-advance value to be used by the UE as the timing-advance setting for communication between the UE and the second system.

8. The method of claim 7, wherein the first system comprises a first radio access network or one or more components of the first radio access network.

9. The method of claim 8, wherein the second system comprises a second radio access network or one or more components of the second radio access network.

10. The method of claim 7, wherein the uplink reference signal is a sounding reference signal (SRS), wherein the measurement request specifies the SRS at least in part by designating a time at which the UE is set to transmit the SRS, and wherein the evaluation of the uplink reference signal comprises determining a difference between the designated time at which the UE is set to transmit the SRS and a time at which the handover target receives the SRS.

11. The method of claim 10, wherein the SRS is defined at least in part by transmission_comb and cyclic_shift parameters, and wherein the measurement request specifies the SRS additionally at least in part by designating the transmission_comb and cyclic_shift parameters.

12. The method of claim 7, further comprising:

receiving at the first system from the second system an identifier useable by the UE to engage communication with the second system; and transmitting from the first system the UE the received identifier.

13. The method of claim 1, further comprising:

receiving at the first system from the second system, in response to the measurement request, a report of signal strength of the specified uplink reference signal of the UE; and deciding by the first system, based at least in part on the received report of signal strength, that the UE should hand over to the second system.

* * * * *